United States Patent
Vollmer

(10) Patent No.: US 6,628,031 B2
(45) Date of Patent: Sep. 30, 2003

(54) HARMONIC-FREQUENCY SYNCHRONOUS MACHINE WITH FLUX CONCENTRATION

(75) Inventor: Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/057,447

(22) Filed: Jan. 25, 2002

(65) Prior Publication Data

US 2003/0011267 A1 Jan. 16, 2003

(30) Foreign Application Priority Data

Jul. 11, 2001 (DE) .......................... 101 33 654

(51) Int. Cl.$^7$ .................................................. H02K 1/27
(52) U.S. Cl. ...................... 310/156.45; 310/156.38; 310/156.39; 310/156.4; 310/156.41; 310/156.42; 310/156.43; 310/156.44; 310/254; 310/179; 310/180
(58) Field of Search .................. 310/156.38–156.45, 310/254, 179–180, 162

(56) References Cited

U.S. PATENT DOCUMENTS

| | | | | |
|---|---|---|---|---|
| 4,242,610 A | * | 12/1980 | McCarty et al. | ....... 310/156.59 |
| 5,051,633 A | * | 9/1991 | Tu et al. | ............. 310/49 R |
| 5,233,250 A | * | 8/1993 | De Filippis | ........... 310/156.45 |
| 5,334,894 A | * | 8/1994 | Nakagawa | ............. 310/49 R |
| 5,642,013 A | * | 6/1997 | Wavre | ........................ 310/254 |
| 5,886,440 A | * | 3/1999 | Hasebe et al. | ......... 310/156.19 |
| 5,936,322 A | * | 8/1999 | Yamaguchi et al. | ... 310/156.19 |
| 5,990,591 A | * | 11/1999 | Yamaguchi et al. | ... 310/156.53 |
| 5,990,592 A | * | 11/1999 | Miura et al. | ........... 310/156.53 |
| 6,049,153 A | * | 4/2000 | Nishiyama et al. | .... 310/156.53 |
| 6,064,128 A | * | 5/2000 | Yagoto et al. | ................ 310/12 |
| 6,133,663 A | | 10/2000 | Hoemann | |
| 6,329,729 B1 | * | 12/2001 | Sakamoto | ................. 310/49 R |
| 6,348,746 B1 | * | 2/2002 | Fujisawa et al. | .............. 310/12 |

FOREIGN PATENT DOCUMENTS

| | | | | |
|---|---|---|---|---|
| EP | | 0 350 727 A2 | 1/1990 | |
| JP | | 55043984 A | * 3/1980 | .......... H02K/21/06 |
| WO | WO 01/80408 A1 | * 10/2001 | | |

OTHER PUBLICATIONS

Coupart et al., Rotary Electric Machine Having a Flux–concentrating Rotor and a Stator With Windings on Teeth, U.S. patent application Publication, Apr. 25, 2002.*

* cited by examiner

Primary Examiner—Thomas M. Dougherty
Assistant Examiner—Jaydi Aguirrechea
(74) Attorney, Agent, or Firm—Henry M. Feiereisen

(57) ABSTRACT

An electric synchronous machine with improved torque characteristic has a stator and a rotor, wherein the stator includes a winding, preferably a three-phase AC winding, with an average coil width $\tau sp$. The rotor is provided with permanent magnets and has a pole pair number of 2p with a pole pitch width $\tau p$, wherein the pitch ratio $\tau sp/\tau p$ is $\geq 2.5$.

15 Claims, 4 Drawing Sheets

HARMONIC-FREQUENCY SYNCHRONOUS MACHINE WITH FLUX CONCENTRATION

CROSS-REFERENCES TO RELATED APPLICATIONS

This application claims the priority of German Patent Application Serial No. 101 33 654.3, filed Jul. 11, 2001, the subject matter of which is incorporated herein by reference.

BACKGROUND OF THE INVENTION

The present invention relates, in general, to an electric machine, and more particularly to an electric synchronous machine with a rotor with permanent magnets arranged in flux concentration.

Electric synchronous machines excited by permanent magnets have certain advantages over electrically excited synchronous machines. In particular, simple synchronous machines with a small pole pitch and a small iron mass can be designed that are powered via a rectifier. Such machines operate with a higher efficiency than electrically excited synchronous machines. Permanent magnets can have a high energy density, i.e., with a large product (flux density×field strength), and hence are superior to electromagnets, which produce a smaller energy density. It is known in the art that permanent magnets can be arranged with a mutual spacing that directly matches the effective gap, also referred to as a "flat" arrangement, but also in a so-called "flux concentration" arrangement.

When the permanent magnets are arranged so as to directly correspond to the effective gap, the flux density of the magnets is approximately identical to the flux density in the effective gap. This is true at least as long as of the effective gap is small in relation to the height of the magnet. With the flux concentration arrangement, the flux densities in the effective gap are greater than those inside the magnet. This is achieved by arranging the magnets across a large area. When viewed in cross section, the area of the magnet is greater than the pole area in the effective gap. Accordingly, the flux density in the pole region is greater than the flux density inside the magnet. It is generally known that the motor torque is proportional to the flux density in the air gap.

It would therefore be desirable and advantageous to provide an improved electric synchronous machine, which produces a greater torque with higher efficiency than conventional synchronous machines.

SUMMARY OF THE INVENTION

According to an aspect of the invention, an electric synchronous machine has a stator and a rotor, wherein the stator may have a three-phase AC winding with an average coil width τsp and the rotor has permanent magnets, wherein the rotor has a pole pair number of 2p with a pole pitch width τp, with the ratio τsp/τp being ≧2.5. The electric machine can be an inner rotor machine, an outer rotor machine or a linear machine.

The magnetic flux density in the stator iron decreases when the ratio of coil width to pole pitch width (τsp/τp) increases. As a result of the reduced flux density in the stator iron, the radial height of the stator iron can be reduced, thereby gaining installation space.

In a configuration with a rotor with permanent magnets in flux concentration arrangement, the magnetic flux density in the air gap can be significantly greater than one Tesla, without causing the stator iron to saturate. Therefore, an electric machine operating in flux concentration can attain a magnetic flux density in the air gap that is approximately twice the flux density of conventional electric synchronous machines.

The flux concentration arrangement advantageously increases the maximum continuous torque that can be produced at a predetermined temperature, sometimes also referred to as "thermal torque", as well as the maximum torque and the overall efficiency over conventional synchronous machines. Moreover, the load capacity of the machine (Nm/kg) also increases by approximately a factor of two compared to conventional electric synchronous machines. The acceleration also increases due to the smaller inertial mass.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
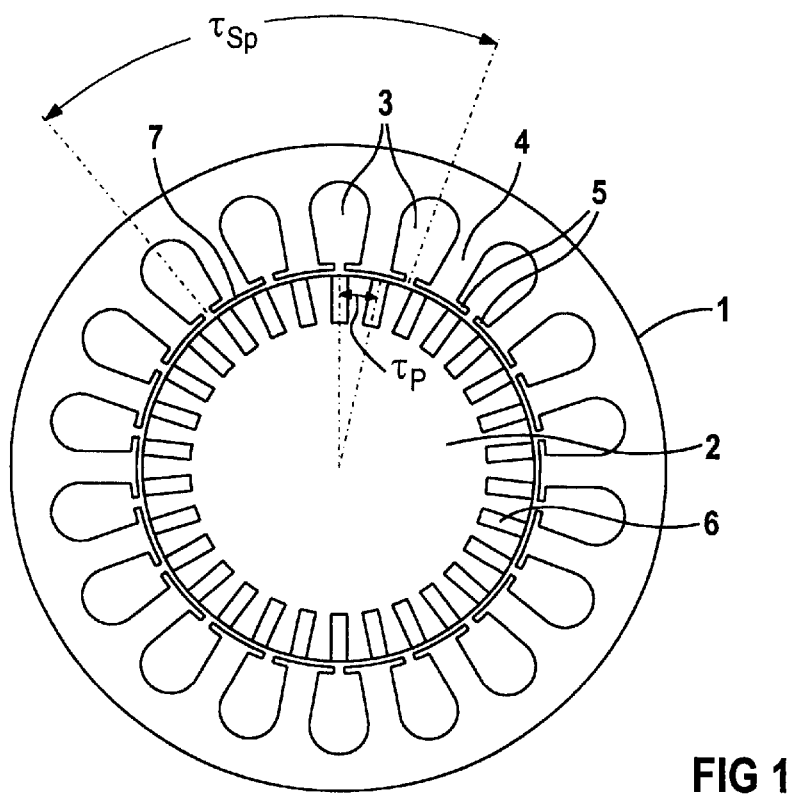
FIG. 1 is a cross sectional view of a synchronous machine according to the present invention.

Throughout all the Figures, same or corresponding elements are generally indicated by same reference numerals.

Figure 7:
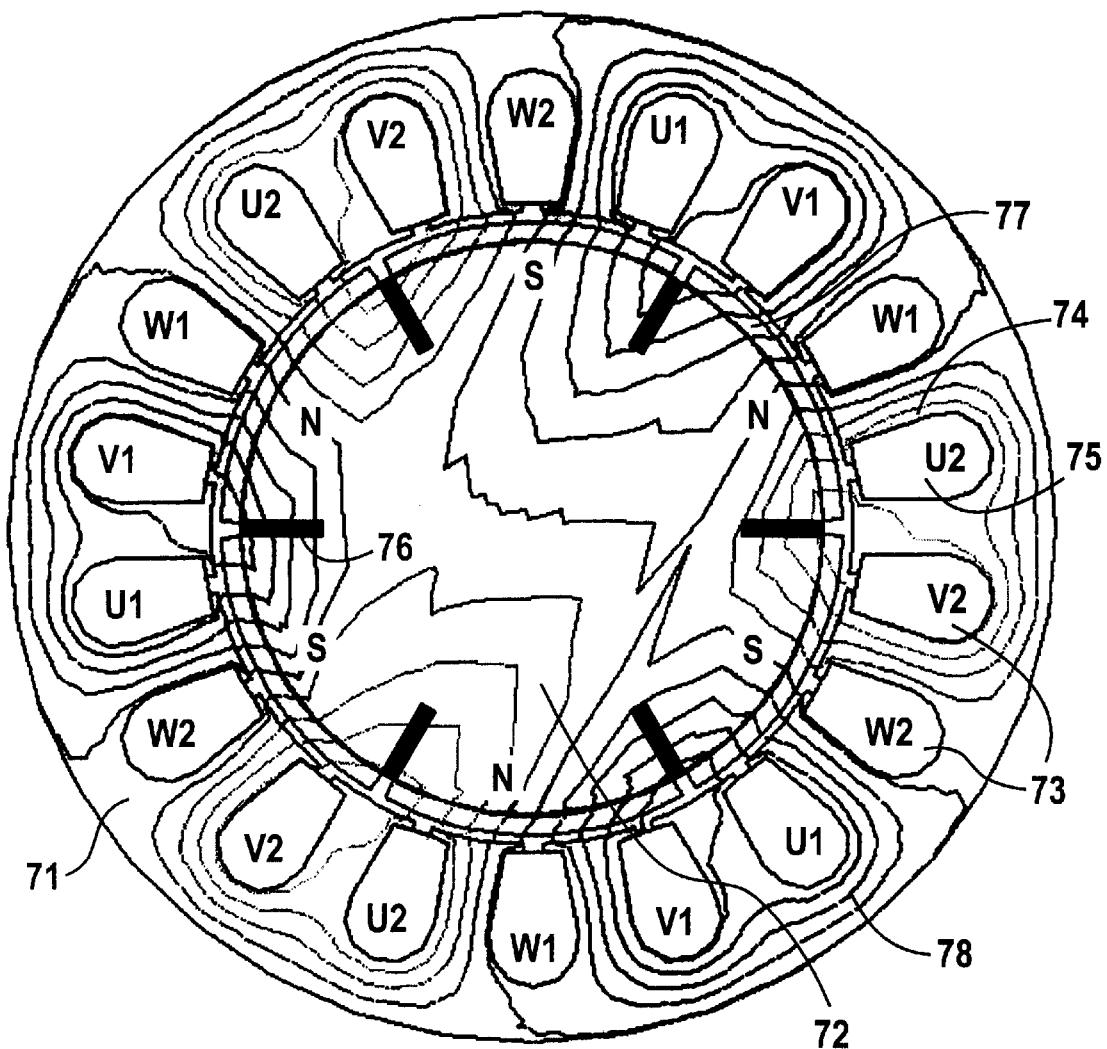
FIG. 7 shows a conventional synchronous machine with a "flat" arrangement of permanent magnets.

For background information, FIG. 7 depicts a detail of a conventional electric synchronous machine with a stator 71 and a rotor 72. The stator 71 has individual slots 73 which are separated from each other by teeth 74. Teeth enlargements 75 are employed to increase the width of the teeth 74 towards the air gap. The electric machine of FIG. 7 has a six-pole stator with 6 pole pairs and a standard winding pattern with 18 slots, and a rotor with likewise 6 pole pairs (2p=6). The windings (not shown) are arranged in the slots 73. The rotor 72 has permanent magnets 76 which are arranged in a "flat" configuration. When the permanent magnets 76 are aligned with the air gaps 77, the magnetic flux in the air gap in the depicted example becomes 0.75 Tesla, whereas the magnetic flux in the teeth 74 reaches a value of 1.4 Tesla and in the yoke 79 1.9 Tesla. These high flux values in the teeth 74 and the yoke 78 can cause saturation of the magnet iron. Conversely, the relatively low magnetic flux in the air gap 77 limits the motor torque.

Referring now to FIG. 1, an electric synchronous machine (the machine itself is not shown according to the invention has a stator 1 which can be constructed essentially in the same manner as the conventional stator 71 described above with reference to FIG. 7. The exemplary stator 1 is designed with 6 pole pairs and a standard winding pattern with 18 grooves 3. The stator 1 has individual grooves 3 which are separated from each other by teeth 4. Teeth enlargements 5 are employed to increase the width of the teeth 4 towards the air gap of the electric synchronous machine. The windings (not shown) are arranged in the grooves 3. The rotor 2 has permanent magnets 6 which are arranged in a direction so as to concentrate the magnetic flux. The term "flux concentration arrangement" refers to an arrangement of the permanent magnets 6 by which the magnetic field lines attain their maximum density inside the air gap 7 of the electric synchronous machine. Also indicated in FIG. 1 are the average coil width τsp of the stator and the pole pitch width τp of the rotor. Coil width τsp herein represents the width of a coil, expressed for a rotary motor in angular units, e.g. degrees, such as the width (60°) of a coil connecting terminals $u_1$ and $u_2$ in FIG. 7. Pole pitch width τp represents the separation, in this case also in angular units, between regularly arranged poles. In the conventional arrangement of FIG. 7, the coil width τsp is equal to the pole pitch width τp.

The windings can be wound around more than one tooth 4 of the coils. In fact, all winding types and systems known in the art, such as fractional pitch windings, two-layer windings, etc., can be employed. An exemplary winding pattern can be a conventional winding pattern for a three-phase stator coil depicted in FIG. 7.

Unlike the conventional rotor 72 of FIG. 7 which has 6 pole pairs, the exemplary rotor 2 according to the invention has 30 pole pairs (2p=30). This arrangement represents a fractional slot winding with a number of closed slots of q=6/30=0.2. The ratio τsp/τp in FIG. 1 is equal to 5. The electric machine constructed with these exemplary parameters τsp and τp hence operates at the $5^{th}$ harmonic of the fundamental AC frequency.

Figure 2:
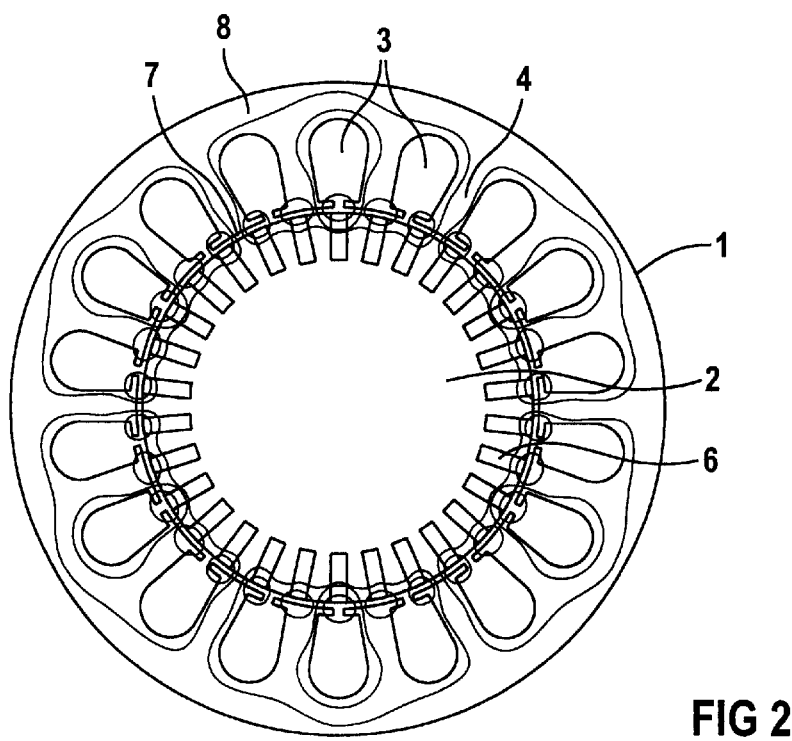
FIG. 2 illustrates schematically a magnetic flux as produced by permanent magnets within the synchronous machine.

FIG. 2 shows a detail of the electric synchronous machine of FIG. 1 without excitation of the stator 1. As can be seen from FIG. 2, the magnetic flux is concentrated in the regions around the air gap 7. Calculations using parameters identical to those of FIG. 7 yield the following values for the magnetic flux: Flux in the air gap 7 is equal to 1.3 Tesla; flux in the teeth 4 is equal to 0.3 Tesla; and flux in the yoke 8 is equal to 0.4 Tesla. Accordingly, for the same stator dimensions, the flux density in both the teeth 4 and the yoke 8 of the stator iron is reduced relative to the conventional electric machine depicted in FIG. 7, so that the height of the yoke 8 in the stator 1 of the electric synchronous machine can be reduced without the risk of saturating the stator iron. Hence, the installation space for the electric machine can also be reduced. The torque characteristic is also improved, since the torque for an identical stator is proportional to the magnetic flux in the air gap. Accordingly, the maximal attainable torque of the electric machine of the invention having a flux concentration arrangement is approximately 70% higher than the torque achieved by the conventional machine of FIG. 7.

Figure 3:
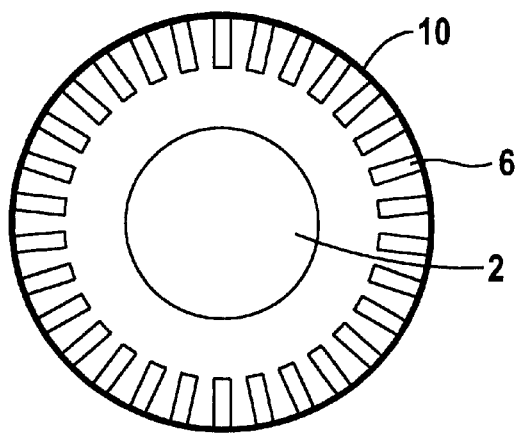
FIG. 3 is a schematic illustration of a first variation for securing permanent magnets.
Figure 4:
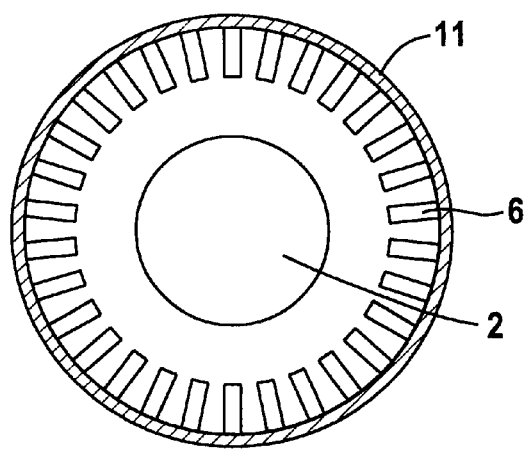
FIG. 4 is a schematic illustration of a second variation for securing permanent magnets.

FIGS. 3 and 4 illustrate approaches for attaching the permanent magnets 6 to the rotor 2. According to FIG. 3, the permanent magnets 6 can be attached with a bandage 10 that surrounds the rotor 2 and conducts the magnetic flux lines.

Alternatively, as depicted in FIG. 4, the permanent magnets 6 can also be secured by a sleeve 11. The sleeve 11 is preferably fastened to the rotor 2 by a heat-shrink fit.

Figure 5:
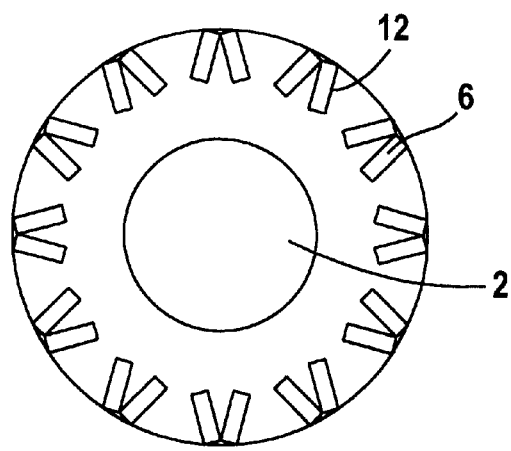
FIG. 5 is a schematic illustration of another embodiment of the permanent magnets for flux concentration.

FIG. 5 shows an alternative arrangement of the permanent magnets 6 in magnetic flux concentration. In this embodiment, the permanent magnets 6 are positioned in the same manner as described above with reference to FIGS. 3 and 4. Alternatively, the permanent magnets 6 can be inserted in axial recesses 12 provided in the rotor 2.

Figure 6:
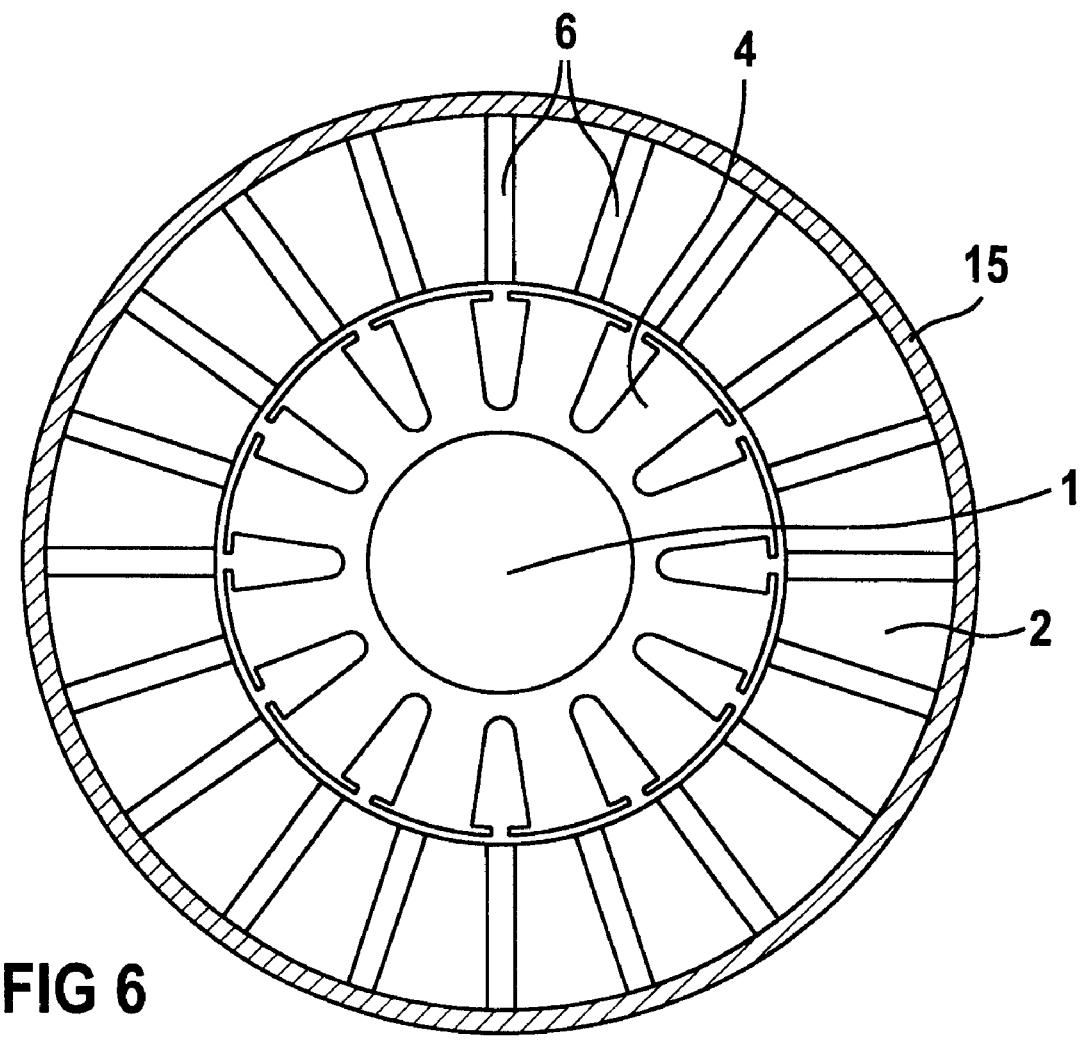
FIG. 6 is a schematic illustration of an external rotor machine in accordance with the present invention.

In an alternative embodiment depicted schematically in FIG. 6, the electric synchronous machine is implemented as an outer rotor machine. The permanent magnets 6 can be affixed by using a non-magnetic ring or sleeve 15, for example, a ring or sleeve made of aluminum, because the material used in the outer periphery of the rotor should not conduct the magnetic flux.

Composite materials can also be employed, in particular in the region of the yoke of the electric synchronous machine, in which case the stator 1 can be constructed of at least two different materials with different conductivities for the magnetic flux.

The synchronous machines according to the invention can be used in all types of manufacturing equipment, such as in the food industry, the textile industry and in machine tools. These synchronous machines can also be used in drive assemblies for vehicles, for example trolleys or electric locomotives. The synchronous machines can also be used for lifting gear due to their advantageous torque characteristic.

While the invention has been illustrated and described as embodied in a harmonic-frequency synchronous machine with flux concentration, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. An electric synchronous machine, comprising:
   a stator having a winding with an average coil width τsp;
   a rotor having a pole pair number 2p with a pole pitch width τp; and
   permanent magnets attached to the rotor,
   wherein a pitch ratio τsp/τp is greater than or equal to 2.5.

2. The synchronous machine of claim 1, wherein the winding is a three-phase AC winding.

3. The synchronous machine of claim 1, wherein the pitch ratio τsp/τp is defined as $(2n\pm1)-x \leq \tau sp/\tau p \leq (2n\pm1)+x$, wherein n is an integer number $\geq 2$, and x has a value of 0.5.

4. The synchronous machine of claim 1, wherein the permanent magnets are arranged in a flux concentration arrangement.

5. The synchronous machine of claim 4, wherein magnetic field lines of the permanent magnets extend essentially tangentially to the rotor, so that the magnetic field lines of the permanent magnets are concentrated in an air gap between the rotor and the stator.

6. The synchronous machine of claim 5, wherein the rotor is an inner rotor, with the permanent magnets secured on the inner rotor by at least one element selected from the group consisting of bandage and magnetically conducting sleeve, wherein the element at least partially surrounds the rotor.

7. The synchronous machine of claim 6, wherein the element conducts the magnetic flux.

8. The synchronous machine of claim 6, wherein the sleeve has a laminated structure.

9. The synchronous machine of claim 1, wherein the rotor is made as a single piece having generally axially extending recesses, wherein the permanent magnets are received in the recesses.

10. The synchronous machine of claim 5, wherein the rotor is an outer rotor, with the permanent magnets secured on the outer rotor by one element selected from the group consisting of a sleeve and a ring, wherein the element is made of non-magnetic material.

11. The synchronous machine of claim 10, wherein the non-magnetic material includes aluminum.

12. The synchronous machine of claim 1, wherein the stator is made of a plurality of materials having different magnetic conductivities.

13. The synchronous machine of claim 11, wherein at least one of the plurality of materials is a composite material.

14. The synchronous machine of claim 1, in the form of a linear motor.

15. Use of an electric synchronous machine of claim 1 in machine tools, production machines or with electric drive assemblies in vehicles.

* * * * *